(12) United States Patent
Mukherjee et al.

(10) Patent No.: US 12,355,631 B2
(45) Date of Patent: Jul. 8, 2025

(54) SIMULATOR FOR ENDC TESTING IN COMMUNICATION NETWORK

(71) Applicant: Rakuten Symphony, Inc., Tokyo (JP)

(72) Inventors: Argha Mukherjee, Bangalore (IN); Mrinal Nandi, Bangalore (IN); Roshan Kumar, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/015,652

(22) PCT Filed: Dec. 30, 2022

(86) PCT No.: PCT/US2022/054366
§ 371 (c)(1),
(2) Date: Jan. 11, 2023

(87) PCT Pub. No.: WO2024/107218
PCT Pub. Date: May 23, 2024

(65) Prior Publication Data
US 2024/0223461 A1    Jul. 4, 2024

(30) Foreign Application Priority Data
Nov. 18, 2022   (IN) .............................. 202241066296

(51) Int. Cl.
*H04L 41/14*     (2022.01)
*H04W 28/08*     (2023.01)

(52) U.S. Cl.
CPC ....... *H04L 41/145* (2013.01); *H04W 28/0942* (2020.05)

(58) Field of Classification Search
None
See application file for complete search history.

(56) References Cited

U.S. PATENT DOCUMENTS

| | | | |
|---|---|---|---|
| 2016/0366604 A1* | 12/2016 | Devarasetty | H04L 5/0053 |
| 2022/0295307 A1* | 9/2022 | Arshad | H04W 76/15 |
| 2024/0314058 A1* | 9/2024 | Mueck | H04L 41/40 |

OTHER PUBLICATIONS

International Search Report and Written Opinion for International Patent Application No. PCT/US22/54366 mailed May 1, 2023.

\* cited by examiner

*Primary Examiner* — Angela Nguyen
(74) *Attorney, Agent, or Firm* — Sughrue Mion, PLLC (57) ABSTRACT

Embodiments are directed to an ENDC simulation server for testing a node in a wireless communication network. A processor of the ENDC simulation server includes a simulated VDU connected to a VCU to be tested and a simulated NRDU connected to a NGCU to be tested. The processor includes a test controller connected to simulated UEs configured to receive testing profile associated with the ENDC simulation server and a MUCE configured to generate a multiple simulated UEs and a first traffic generator to generate a traffic profile based on the testing profile. The simulated VDU includes an LTE DU simulator to generate simulated LTE DUs based on the testing profile and a second traffic generator to generate a traffic profile based on the testing profile. The simulated NRDU includes a 5G DU simulator to generate simulated 5G DUs based on the testing profile.

20 Claims, 7 Drawing Sheets

SIMULATOR FOR ENDC TESTING IN COMMUNICATION NETWORK

CROSS-REFERENCE TO RELATED APPLICATIONS

The present application claims priority to and is the 35 U.S.C. § 371 United States National Phase application based on International Patent Application No. PCT/US22/54366, filed Dec. 30, 2022, and entitled "Simulator for ENDC Testing in Communication Network," which claims priority to Indian Patent Appl. No. 202241066296 to Argha Mukherjee et al., filed Nov. 18, 2022, and entitled "Simulator for ENDC Testing in Communication Network", and incorporates their disclosures herein by reference in its entirety their entireties.

FIELD OF INVENTION

The present disclosure relates to device testing and simulation and more specifically related to a method and an E-UTRAN New Radio-Dual Connectivity (ENDC) simulation server for testing a node in a wireless communication network.

BACKGROUND

With advancement in technology, a number of users connected to a wireless communication network have increased drastically over time. Therefore, it is important to provide reliable and efficient operation of network functional elements to ensure high quality of service (QOS) to the users. In order to ensure the efficiency of the network functional elements network operators typically test the network functional elements using testing devices before deploying in a live wireless communication network.

The testing devices simulate various communication network conditions while testing the network functional elements which may include for example but not limited to, simulating a number of user equipment or UEs capable of simultaneously registering/de-registering with the wireless communication network, simulating inter-/intra-mobile network equipment handover, transmitting bearer traffic, and/or combinations thereof. The testing of the network functional elements may be one of the three categories which includes functional correctness testing (e.g., protocol validation and compliance), inter-system compatibility and integration testing, and stress testing.

In general, ENDC is a non-standalone (NSA) architecture that allows mobile devices to access both 5th generation (5G) and 4th generation (4G) long-term evolution (LTE) networks at same time. The ENDC provides a combined bandwidth of both the 5G and the 4G LTE, effectively allowing carriers to take advantage of the benefits of both network technologies simultaneously. In the NSA architecture of the 5G deployment, the mobile devices utilize 5G radio infrastructure while control functions such as signalling use the 4G LTE network. Therefore, for testing the ENDC, simulator should be able to replicate both the 5G and the 4G LTE network along with all entities to emulate real-filed deployment along with efficient resource utilization. Thus, it is desired to at least provide a mechanism for auto focus that is devoid of the above issues.

OBJECT OF INVENTION

The principal object of the embodiments herein is to provide method and an E-UTRAN New Radio-Dual Connectivity (ENDC) simulation server for testing a node in a wireless communication network. Therefore, the proposed method provides a very flexible ENDC simulation server in terms of deployment and can be extended as per test requirements. The ENDC simulation server can be used for testing NGDU alone with all features of the proposed method being available. Also, the ENDC simulation server consumes less resources to simulate near to filed deployment scenarios with easy configurations in terms of number of UE per cell, cells per DU, DUs per CU and such scenarios.

SUMMARY

Accordingly, embodiments herein disclose an E-UTRAN New Radio-Dual Connectivity (ENDC) simulation server for testing a node in a wireless communication network. The ENDC simulation server includes a memory, a processor and a communicator. The processor includes a simulated virtual distributed unit (VDU) connected to a virtual long-term evolution (LTE) centralized unit (VCU) to be tested: a simulated new radio distributed unit (NRDU) connected to a next generation radio centralized unit (NGCU) to be tested and a test controller connected to a plurality of simulated UEs configured to receive at least one testing profile associated with the ENDC simulation server. The processor also includes a multi user equipment (UE) simulator (MUCE) configured to dynamically generate a plurality of simulated UEs based on the at least one testing profile and a first traffic generator configured to generate a traffic profile based on the at least one testing profile. The simulated VDU includes an LTE DU simulator configured to generate a plurality of simulated LTE DUs based on the at least one testing profile, a second traffic generator configured to generate a traffic profile based on the at least one testing profile. The simulated NRDU includes a 5G DU simulator configured to generate a plurality of simulated 5G DUs based on the at least one testing profile, an IP security Manager (IPSEC MGR) configured to simulate internet protocol (IPSEC) functionality between at least one 5G DU and the NGCU.

In an embodiment, the first traffic generator is a downlink (DL) traffic generator which is a source of DL traffic and an end point of UL traffic and wherein the second traffic generator is an uplink (UL) traffic generator which is a source of UL traffic and an end point of DL traffic.

In an embodiment, the 5G DU simulator comprises a Control Plane Simulator (CPSIM) configured to simulate control plane functionality between at least one 5G DU and the NGCU based on the at least one testing profile and a User Plane Simulator (UPSIM) configured to simulate user plane functionality between at least one 5G DU and the NGCU based on the at least one testing profile. The ENDC simulation server provides communication between the simulated VDU, the simulated NGDU, the VCU and the NGCU using one of a Secondary Cell Group (SCG) path of communication and a split bearer by splitting the traffic into two paths.

In an embodiment, VDU SIM of the VDU comprises the second traffic generator and Packet Data Convergence Protocol (PDPC) manager and wherein the IPSEC MGR simulates the IPSEC functionality by encrypting at least one of a UP payload and a CP payload.

In an embodiment, the 5G DU simulator comprises a Control Plane Simulator (CPSIM) configured to simulate control plane functionality between at least one 5G DU and the NGCU based on the at least one testing profile and a User Plane Simulator (UPSIM) configured to simulate user plane functionality between at least one 5G DU and the NGCU based on the at least one testing profile.

Accordingly, embodiments herein disclose a method for testing a node in a wireless communication network using an E-UTRAN New Radio-Dual Connectivity (ENDC) simulation server. The method includes receiving, by the ENDC simulation server, at least one testing profile associated with at least one of VCU and NGCU and generating, by the ENDC simulation server, a plurality of simulated UEs and at least one of plurality of simulated LTE DUs and a plurality of simulated 5G DUs based on the at least one testing profile. The ENDC simulation server comprises a simulated VDU and a simulated NRDU. The method also includes generating, by the ENDC simulation server, a signalling path through the simulated VDU and a data path through the simulated NRDU and generating, by the ENDC simulation server, a traffic profile for the plurality of simulated UEs based on the at least one testing profile. Further, the method includes testing, by the ENDC simulation server, at least one of the VCU and the NGCU based on the generated traffic profile, wherein the test is at least one of function testing, a capacity testing and a coverage testing for the at least one of the VCU and the NGCU using the plurality of UEs.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by anolog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein disclose an E-UTRAN New Radio-Dual Connectivity (ENDC) simulation server for testing a node in a wireless communication network. The ENDC simulation server includes a memory, a processor and a communicator. The processor includes a simulated virtual distributed unit (VDU) connected to a virtual long-term evolution (LTE) centralized unit (VCU) to be tested: a simulated new radio distributed unit (NRDU) connected to a next generation centralized unit (NGCU) to be tested and a test controller connected to a plurality of simulated UEs configured to receive at least one testing profile associated with the ENDC simulation server. The processor also includes a multi user equipment (UE) simulator (MUCE) configured to dynamically generate a plurality of simulated UEs based on the at least one testing profile and a first traffic generator configured to generate a traffic profile based on the at least one testing profile. The simulated VDU includes an LTE DU simulator configured to generate a plurality of simulated LTE DUs based on the at least one testing profile, a second traffic generator configured to generate a traffic profile based on the at least one testing profile. The simulated NRDU includes a 5G DU simulator configured to generate a plurality of simulated 5G DUs based on the at least one testing profile, an IP security Manager (IPSEC MGR) configured to simulate internet protocol (IPSEC) functionality between at least one 5G DU and the NGCU.

Accordingly, embodiments herein disclose a method for testing a node in a wireless communication network using an E-UTRAN New Radio-Dual Connectivity (ENDC) simulation server. The method includes receiving, by the ENDC simulation server, at least one testing profile associated with at least one of VCU and NGCU and generating, by the ENDC simulation server, a plurality of simulated UEs and at least one of plurality of simulated LTE DUs and a plurality of simulated 5G DUs based on the at least one testing profile. The ENDC simulation server comprises a simulated VDU and a simulated NRDU. The method also includes generating, by the ENDC simulation server, a signalling path through the simulated VDU and a data path through the simulated NRDU and generating, by the ENDC simulation server, a traffic profile for the plurality of simulated UEs based on the at least one testing profile. Further, the method includes testing, by the ENDC simulation server, at least one of the VCU and the NGCU based on the generated traffic profile, wherein the test is at least one of function testing, a capacity testing and a coverage testing for the at least one of the VCU and the NGCU using the plurality of UEs.

In the conventional commercially available simulators (nor opensource tools) are not capable of testing the NGCU and the VCU in the same product offering simultaneously. All commercial simulators can test either NGCU or VCU but not in combined deployment. Unlike to the conventional methods and systems, the proposed simulator allows the ENDC deployment (X2/Xn) within a single framework of simulators which is near field deployment use-case.

Unlike to the conventional methods and systems, the proposed simulator combines LTE, ENDC and NR nodes and emulates them within a single infrastructure.

Referring now to the drawings, and more particularly to FIGS. 1 through 6, where similar reference characters denote corresponding features consistently throughout the figures, there are shown preferred embodiments.

Figure 1:
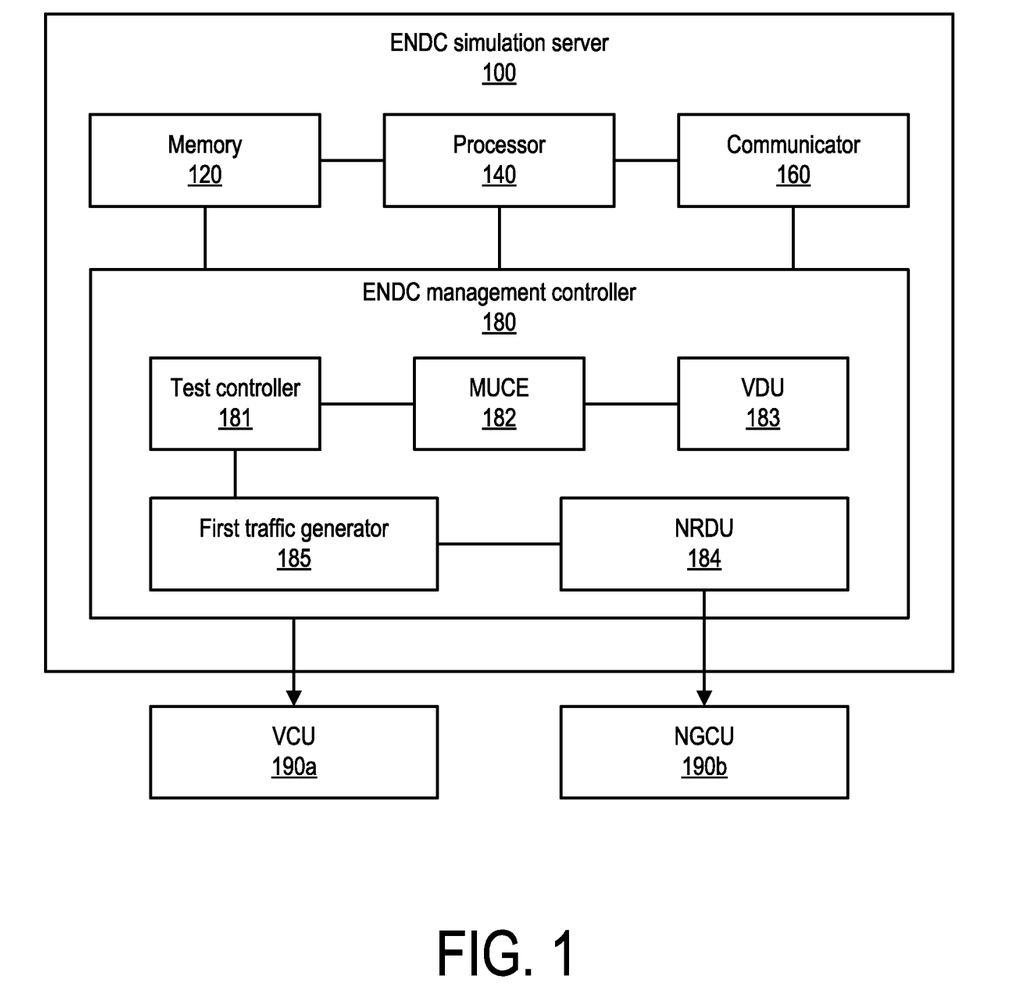
FIG. 1 illustrates a block diagram of a ENDC simulation server for testing a node in a wireless communication network, according to an embodiment as disclosed herein.

FIG. 1 illustrates a block diagram of a ENDC simulation server (100) for testing a node in a wireless communication network, according to an embodiment as disclosed herein.

The ENDC simulation server (100) includes a memory (120), a processor (140), a communicator (160) and a ENDC management controller (180). The ENDC management controller (180) includes a test controller (181), a multi-UE simulator (MUCE) (182), a virtual DU (183), a NRDU (184) and a first traffic generator (185). The ENDC management controller (180) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors. The FIG. 1 indicates the ENDC management controller (180) out of the processor (140). However, the ENDC management controller (180) can be incorporated within the processor (140) or as part of any other processor/processors or can in itself be a processor.

The memory (120) is configured to store instructions to be executed by the processor (140). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information. In certain examples, a non-transitory storage medium may store data that can, over time, change (e.g., in Random Access Memory (RAM) or cache).

The processor (140) communicates with the memory (120), the communicator (160) and the ENDC management controller (180). The processor (140) is configured to execute instructions stored in the memory (120) and to perform various processes. The processor may include one or a plurality of processors, may be a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (160) includes an electronic circuit specific to a standard that enables wired or wireless communication. The communicator (160) is configured to communicate internally between internal hardware components of the ENDC simulation server (100) and with external devices via one or more networks.

In an embodiment, the test controller (182) is configured to receive at least one testing profile associated with a virtual long-term evolution (LTE) centralized unit (VCU) (190a) and a next generation centralized unit (NGCU) (190b). The test controller (181) is for example a Test automation controller (TAC). The at least one testing profile includes at least one of: a number of UEs to be simulated, a traffic profile for each simulated UE, a number of DUs to be simulated, number of cells, number of sectors within each of the cells, routes for connecting each of the cells and channel conditions to be simulated. The traffic profile for each simulated UE includes at least one of a speed at which the simulated UE travels through the network and a traffic pattern mixture of data and voice calls.

The test controller (182) is configured to test the VCU (190a) and the NGCU (190b) based on the received at least one testing profile by sending test sequences or signalling messages, etc. The test can be at least one of function testing, a capacity testing and a coverage testing for the VCU (190a) and the NGCU (190b) using the plurality of simulated UEs. The test controller (182) is also configured to deploy a signalling channel and a data channel separately based on the at least one testing profile. Therefore, the signalling channel cannot be used for transmission and the data channel cannot be used for signalling. The signalling channel and the data channel are exclusive and dedicated channels.

In another embodiment, the test controller (182) is configured to determine at least one of a UE load meets a UE load threshold and a 5G DU load meets a 5G DU load threshold or an LTE DU load meets an LTE DU load threshold and deploy at least one of the plurality of simulated UEs, the plurality of simulated 5G DUs or the plurality of simulated LTE DUs in another ENDC simulation server (100a). The UE load is determined based on a number of UEs to be simulated, the 5G DU load is based on a number of 5G DUs to be simulated AND the LTE DU load is based on a number of LTE DUs to be simulated. Here, logs associated with each of the 5G DUs/LTE DUs are granular and available for the complete CP. Hence the detection of error is simpler and faster compared to existing methods. In the existing methods if there is an error in any of the 5G DUs/LTE DUs then the user will have to check for log files of each of the 5G DUs/LTE DUs which is cumbersome process. Therefore, the erroneous DU is easily identified and excluded from further usage. Therefore, the statistics and logs are very modular and the user can detect any issue in no time.

In an embodiment, the MUCE (182) is configured to dynamically generate a plurality of simulated UEs based on the at least one testing profile. A number of the plurality of simulated UEs is determined based on user preference provided in the testing profile input by the user. The number of the plurality of simulated UEs can be varied based on the scenario to be tested. For example, for UE load testing the number of UEs to be simulated may be very large say 64 k UEs. However, for functional testing the number of the plurality of simulated UEs is comparatively lower say 256 UEs. Therefore, in the proposed method the MUCE (182) can simulate any number of UEs depending on the user requirement and there is no limit on the number of UEs that can be simulated.

In an embodiment, the VDU (183) is configured to generate a plurality of simulated 4G LTE DUs based on the at least one testing profile and hence the number of simulated 4G LTE DUs is customized based on the user preference. The VDU (183) includes plurality of VDU-SIM (183a). PDCP (183b), second traffic generator (183c) and multiple IROUTE (183da-db).

In an embodiment, the NRDU (184) is configured to generate a plurality of simulated 5G DUs based on the at least one testing profile and hence the number of simulated 5G DUs is customized based on the user preference. The NRDU (184) includes multiple Control Plane Simulators (NR-CPSIM) (184aa) and a User Plane Simulator (NR-UPSIM) (184ab). The NR-CPSIM (184aa) is configured to simulate control plane functionality between at least one NRDU (184) and the NGCU (190a) based on the at least one testing profile. Here, the plurality of DUs is deployed as for example the CP SIMs. Each of the NR-CPSIM (184aa) is deployed as a single 5G DU. The number of simulated 5G DUs can be increased with addition of every NR-CPSIM (184aa).

Further, multiple NR-CPSIM (184aa) can be clubbed together and deployed as a single application which reduces the memory usage and processing capacity of the ENDC simulation server (100). The NR-UPSIM (184ab) is configured to simulate user plane functionality between at least one 5G DU and the NGDU (190b) based on the at least one testing profile.

Further, the ENDC simulation server (100) can be modified to emulate LTE sectors and NR cells separately per DU or NRDU. The ENDC simulation server (100) can trigger different scenarios per simulated DUs. So large combination of test scenarios can be covered. The ENDC simulation server (100) can be used in functional and capacity (most preferable) testing. The ENDC simulation server (100) provides communication between the simulated VDU, the simulated NGDU, the VCU and the NGCU using one of a Secondary Cell Group (SCG) path of communication and a split bearer by splitting the traffic into two paths.

In another embodiment, the test controller (182) is configured to determine an error in at least one of: 5G DU during the testing of the NGCU (190b) and at least one LTE DU during the testing of the VCU (190a) and continue the test of the at least one of: the NGCU (190b) using the remaining 5G DUs of the plurality of 5G DUs after excluding erroneous 5G DU and, the VCU (190a) using the remaining LTE DUs of the plurality of LTE DUs after excluding erroneous LTE DU. Further, the test controller (182) is configured to display a message on the test controller (182) indicating the erroneous LTE DU or the erroneous 5G DU.

At least one of the plurality of modules/components of the test controller (181) may be implemented through an AI model. A function associated with the AI model may be performed through memory (120) and the processor (140). The one or a plurality of processors controls the processing of the input data in accordance with a predefined operating rule or the AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process is a method for training a predetermined target device (for example, a robot) using a plurality of learning data to cause, allow; or control the target device to make a determination or prediction. Examples of learning processes include, but are not limited to, supervised learning, unsupervised learning, semi-supervised learning, or reinforcement learning.

In this method the device to be tested is the ENDC system which includes the NGCU and the virtual long-term evolution (LTE) centralized unit (VCU). The DUT may also include gnome, 5G core, EPC, etc. The ENDC simulation server (100) can be collocated with real DU and real UEs as well. In that case few sectors are simulated and few are real in the VCU. So, the VCU/the NGCU can include both real and simulated sectors.

Although the FIG. 1 shows various hardware components of the ENDC simulation server (100) but it is to be understood that other embodiments are not limited thereon. In other embodiments, the ENDC simulation server (100) may include less or a greater number of components. Further, the labels or names of the components are used only for illustrative purpose and does not limit the scope of the invention. One or more components can be combined together to perform same or substantially similar function to manage the contact pressure in the ENDC simulation server (100).

Figure 2:
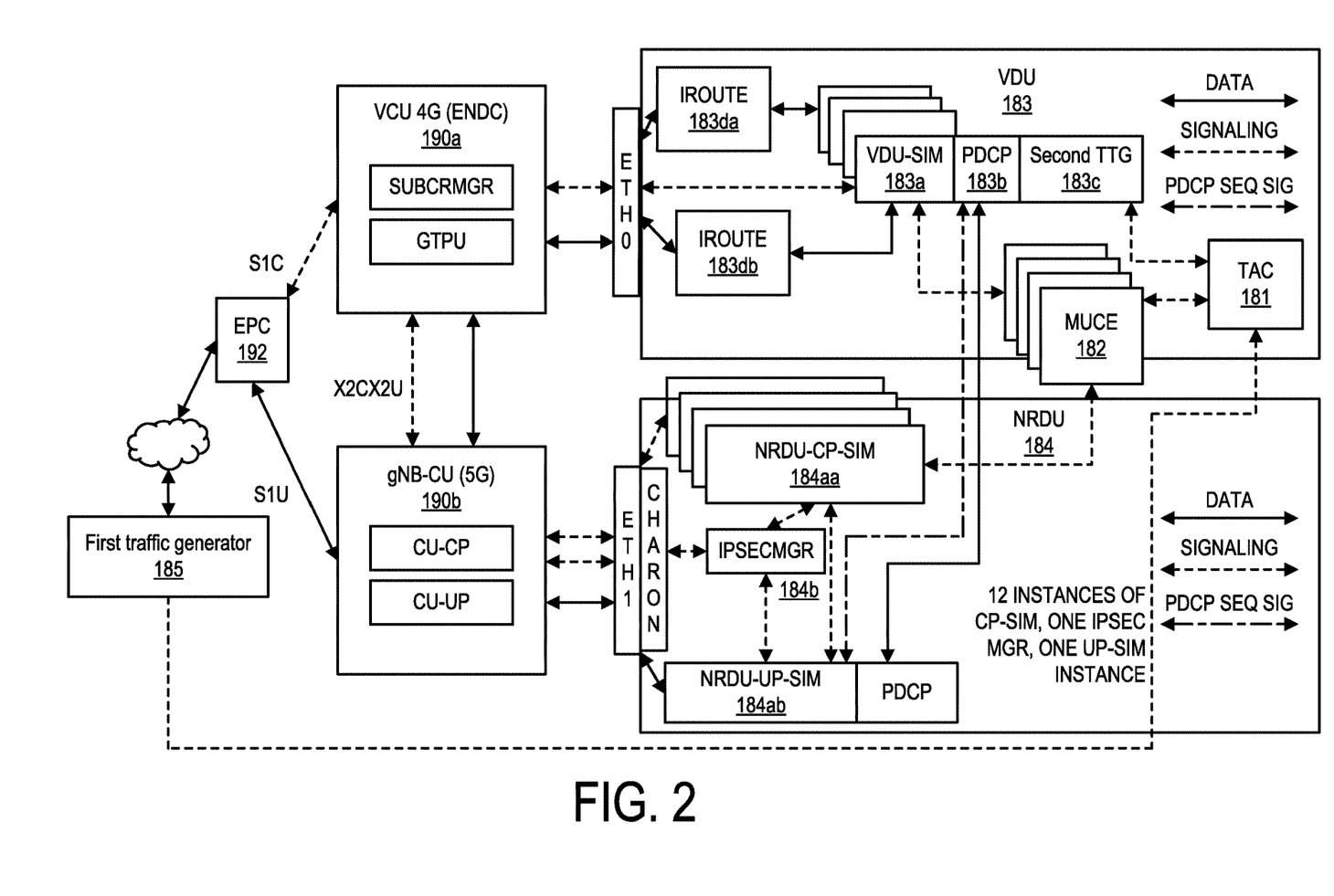
FIG. 2 is an example deployment of the ENDC simulation server to test a NGCU and a VCU of an ENDC system, according to an embodiment as disclosed herein.

FIG. 2 is an example deployment of the ENDC simulation server (100) to test the NGCU (190*b*) and the VCU (190*a*) of an ENDC system, according to an embodiment as disclosed herein.

The ENDC is a Non-Standalone (NSA) feature that makes it possible for mobile devices to access both 5G and 4G LTE networks at the same time, which allows carriers to tap into the benefits of both network technologies simultaneously. Most 5G networks today are NSA, and so rely on a 4G network core as opposed to Standalone (SA), in which a brand new 5G network core is deployed. The complete gNB is split into 4G and 5G. In the ENDC simulation server (100), the interfaces are proprietary and not specification driven. In the conventional simulators, the DU is connected to radio and the particular tester's radio dependency was huge. Therefore, to integrate the radio and DU with the CU to form a complete end-to-end setup was time consuming and requires huge hardware resources even for basic functionality testing.

Conventional testers can either test the VCU or the NGCU individually. As a result, the testing process and the simulation becomes expensive. Also, since both the VCU and the NGCU cannot be tested simultaneously the real field deployment environment cannot be created and hence the efficiency of the testing may not be high. Testing the VCU or the NGCU individually has the draw back that the behaviour of the VCU or the NGCU in the presence of the other cannot be determined or tested. With ENDC in picture the requirement is that both the VCU and the NGCU must be tested simultaneously.

Unlike to the conventional methods and systems, the proposed method simulates a near-filed combined deployment of both the VCU and the NGCU.

Referring to the FIG. 2, the exact structure of the ENDC simulation server (100) is provided. The VDU (183) includes a second traffic generator (183*c*) which is an uplink (UL) traffic generator which is a source of UL traffic and an end point of DL traffic. The first traffic generator (185) is a downlink (DL) traffic generator which is a source of DL traffic and an end point of UL traffic. Therefore, the proposed system is a closed loop system. Here, the test unit is combination of the VCU (190*a*) and the NGCU (190*b*). The signalling between the VCU (190*a*) and the NGCU (190*b*) happens using X2C over HTTP protocol and X2U over GTP protocol. Here, the signalling goes via 4G radio and the data goes through the SIU.

The IPSEC MGR (184*b*) is configured to simulate internet protocol (IPSEC) functionality between at least one 5G DU and the NGCU (190*b*). The IPSEC MGR (184*b*) simulates the IPSEC functionality by encrypting at least one of a UP payload and a CP payload that needs to be sent to the NGCU (190*b*). CHARON is a IPSEC entity used to create the IPSEC enabled payload.

In general, the 4G VCU (190*a*) and the VDU (183) together forms eNB. The 4G VCU (190*a*) is provided in a virtualized environment. To test the 4G VCU (190*a*), the 4G VCU (190*a*) needs to be connected to multiple VDUs. Each of the VDU (183) is radio dependent and hence in conventional testing of the ENDC, multiple hardware components such as the UE, Radio units, etc are required. Ip Sec and Ip over ip tunnel functionality both are supported by the VDU (183) midhaul toward the 4G VCU (190*a*). User can configure either of the tunnelling in the MH and VDU (183) will simulate the selected tunnelling. However, in the NGDU (184) supports only Ipsec in the NRDU MH to the NGCU (190*b*).

The simulator includes integrated traffic generator and hence is a controlled way of testing. Once the UE communication and traffic arrives at the second TTG (183*c*), then the traffic appears to be split for both the VCU (190*a*) and the NGCU (190*b*).

Consider that the configuration for a particular bearer is SCG. The traffic will originate from the first TTG (185) and go towards the VDU PDCP (183*b*). From there the traffic will come towards the NR PDCP (184*ac*) and from there it will go to the NGCU (190*b*) and to the EPC (192). This is complete SCG mode of deployment.

Further, in a split mode, the split bearer is implemented. The traffic is split at the VDU PDCP (183*b*) as a result a portion of the traffic goes towards the VCU (190*a*) and the other portion goes towards the NGCU (190*b*). Here, the data path is completely segregated from the MUCE (182) to increase the throughput. Further, the split bearer with different split ratio along with the SCG and the MCG are supported. A Number of the ENDC capable UE is configured by the MUCE (182). In that case few UEs will be ENDC capable and rest are LTE only UEs.

In the ENDC simulator, the UE is always like 4G but is capable of handling ENDC traffic. However, the signalling part will be clearly 4G. NGDU (183) has only the data path.

Consider that the UE attaches to the ENDC simulator server (100). When the UE attaches to the ENDC simulator server (100)a default bearer is created. The default bearer pumps some traffic. Then the ENDC simulator server (100) determines that the throughput requirement is not being met by the default bearer and that the UE wants to enhance the traffic. The UE sends the measurement report to the 4G CU (190*a*) to inform the 4G CU (190*a*) that the UE is receiving a signal from the NGDU (184) and that the UE wants to create either SCG or the split bearer. Once the 4G CU (190*a*) sends the acknowledgement for the measurement report sent by the UE, then the VDU (183) will create an additional bearer and split the traffic between the NGDU (184) and the VDU (183). The NGDU (184) is completely for the data path and the VDU (183) is for RRC signalling.

Therefore, in order to test the CU the user will have to deploy the proposed system on a Linux Server. The proposed simulator can test 4G macro and 4G small cell capacity and functions.

The eNB is distributed as VCU (190*a*) and VDU (183). Therefore, the proposed method provides near field deployment scenario where both the NGDU (184) and the VDU (183) are operative. The proposed method provides very low CPU usage as the NRDU-CP-SIMs are stacked up together to provide a single deployment which act as multiple DUs being deployed. The proposed method provides all forms of controlled traffic and any throughput, split bearer configuration, SCG configuration and only MCG configuration.

Further, the first traffic generator (185) and the second TTG (183*c*) may include schedulers to vary traffic such as burst traffic, one-by-one traffic, etc can be generated based on the test profile provided by the user. Based on the test profile the internal payload will be simulated with the required traffic profile. Therefore, the proposed method allows the user to emulate the entire real-time environment such that the NGCU (190) will believe that the payload is arriving from the real-environment.

The proposed design is very flexible such that even with a single core and minimum number of RAM the ENDC simulation server (100) will be able to simulate as many UEs as possible.

Horizontal scaling can be performed in the design to include multiple CP-SIM due to the split architecture which includes separate data path and signal path with the UEs separated from the DUs. For example, when more UE load is required the MUCE (182) can be deployed in a separate server out of the ENDC simulation server (100). Similarly, when more control path load is required the VDU-SIM/CP-SIM can be deployed in a separate server out of the NR ENDC DU simulation server (100) or when more data path load is required the UP-SIM can be deployed in a separate server out of the ENDC simulation server (100). Therefore, the proposed design provides very high flexibility and granularity in simulating the ENDC simulation server (100).

Further, the proposed design allows the user to deploy multiple ENDC simulation server (100)s to generate more load by replicating the functionality of one of the ENDC simulation server (100) to achieve vertical scaling of the ENDC simulation server (100).

Also, the proposed method allows the downgrading and upgrading of the memory usage depending on the requirement of the test profile to be generate.

Figure 3A:
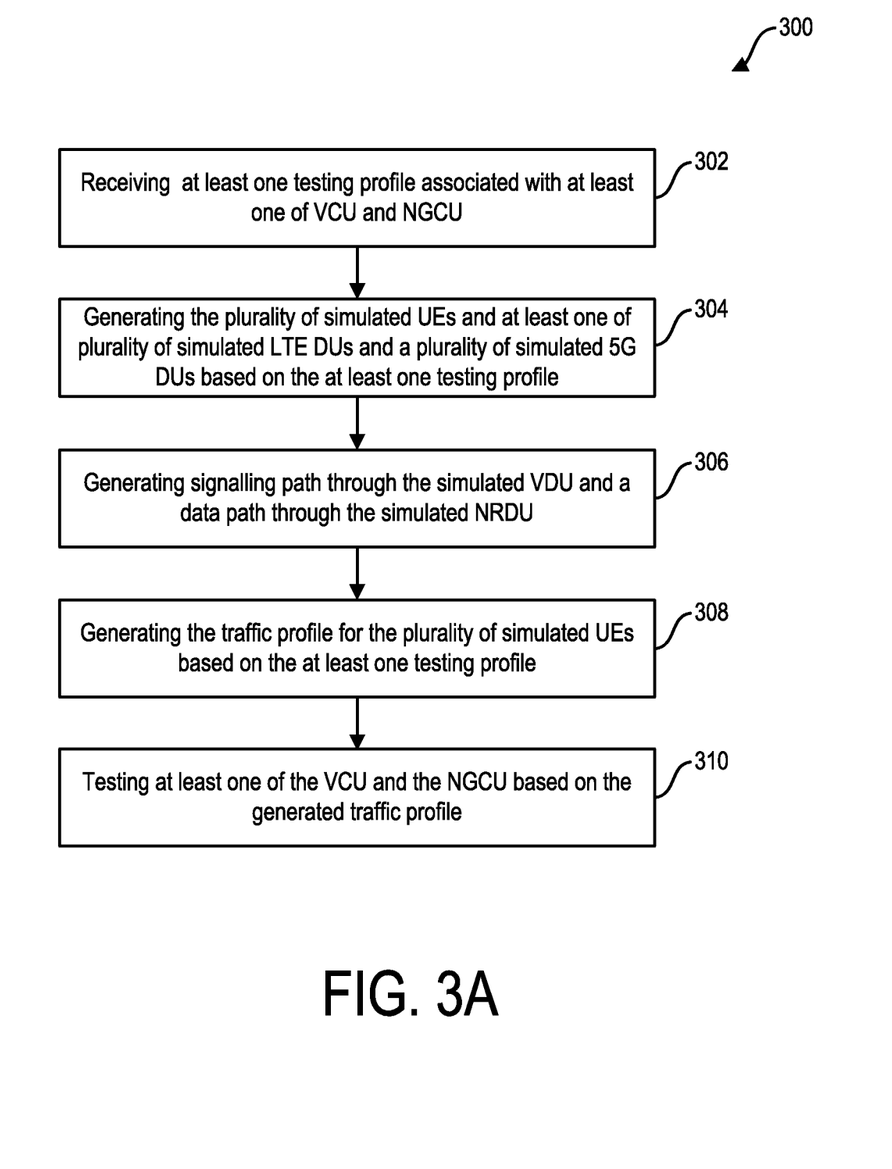
FIG. 3A is a flow diagram illustrating a method for testing the node in the wireless communication network using the ENDC simulation server, according to an embodiment as disclosed herein.

FIG. 3A is a flow diagram (300) illustrating a method for testing the node in the wireless communication network using the ENDC simulation server (100), according to an embodiment as disclosed herein.

Referring to the FIG. 3A, at step 302, the method includes the ENDC simulation server (100) receiving the at least one testing profile associated with at least one of VCU (190a) and NGCU (190b). For example, in the ENDC simulation server (100) described in the FIG. 1, the ENDC management controller (180) is configured to receive the at least one testing profile associated with at least one of VCU (190a) and NGCU (190b).

At step 304, the method includes the ENDC simulation server (100) generating the plurality of simulated UEs and at least one of the plurality of simulated LTE DUs and the plurality of simulated 5G DUs based on the at least one testing profile. For example, in the ENDC simulation server (100) described in the FIG. 1, the ENDC management controller (180) is configured to generate the plurality of simulated UEs and at least one of the plurality of simulated LTE DUs and the plurality of simulated 5G DUs based on the at least one testing profile.

At step 306, the method includes the ENDC simulation server (100) generating the signalling path through the simulated VDU (183) and the data path through the simulated NRDU (184). For example, in the ENDC simulation server (100) described in the FIG. 1, the ENDC management controller (180) is configured to generate the signalling path through the simulated VDU (183) and the data path through the simulated NRDU (184).

At step 308, the method includes the ENDC simulation server (100) generating the traffic profile for the plurality of simulated UEs based on the at least one testing profile. For example, in the ENDC simulation server (100) described in the FIG. 1, the ENDC management controller (180) is configured to generate the traffic profile for the plurality of simulated UEs based on the at least one testing profile.

At step 310, the method includes the ENDC simulation server (100) testing at least one of the VCU (190a) and NGCU (190b) based on the generated traffic profile. For example, in the ENDC simulation server (100) described in the FIG. 1, the ENDC management controller (180) is configured to test at least one of the VCU (190a) and NGCU (190b) based on the generated traffic profile.

Figure 3B:
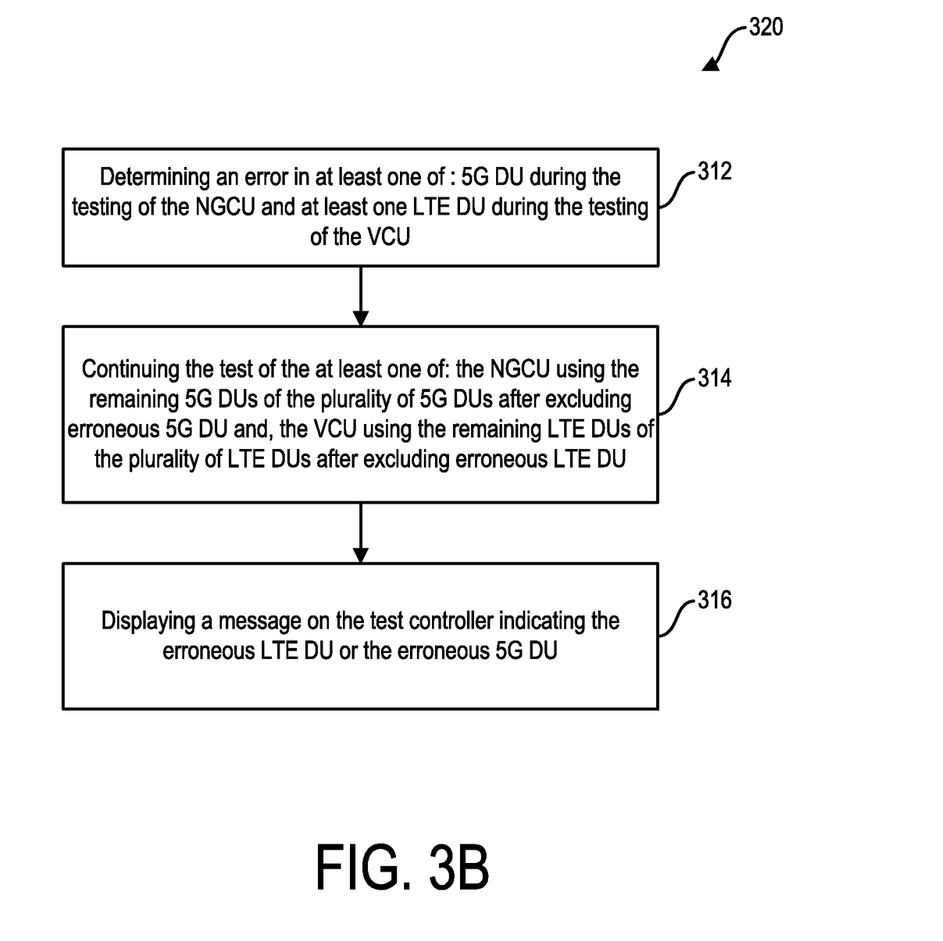
FIG. 3B is a flow diagram illustrating a method for continuing the testing of the node in the wireless communication network using the ENDC simulation server during an error, according to an embodiment as disclosed herein.

FIG. 3B is a flow diagram (320) illustrating a method for continuing the testing of the node in the wireless communication network using the ENDC simulation server (100) during the error, according to an embodiment as disclosed herein.

Referring to the FIG. 3B, at step 312, the method includes the ENDC simulation server (100) determining the error in at least one of the 5G DU during the testing of the NGCU (190b) and at least one LTE DU during the testing of the VCU (190a). For example, in the ENDC simulation server (100) described in the FIG. 1, the ENDC management controller (180)) is configured to determine the error in at least one of the 5G DU during the testing of the NGCU (190b) and at least one LTE DU during the testing of the VCU (190a).

At step 314, the method includes the ENDC simulation server (100) continuing the test of the at least one of: the NGCU (190b) using the remaining 5G DUs of the plurality of 5G DUs after excluding erroneous 5G DU and, the VCU (190a) using the remaining LTE DUs of the plurality of LTE DUs after excluding erroneous LTE DU. For example, in the ENDC simulation server (100) described in the FIG. 1, the ENDC management controller (180) is configured to continue the test of the at least one of: the NGCU (190b) using the remaining 5G DUs of the plurality of 5G DUs after excluding erroneous 5G DU and, the VCU (190a) using the remaining LTE DUs of the plurality of LTE DUs after excluding erroneous LTE DU.

At step 316, the method includes the ENDC simulation server (100) displaying the message on the test controller (181) indicating the erroneous LTE DU or the erroneous 5G DU. For example, in the ENDC simulation server (100) described in the FIG. 1, the ENDC management controller (180) is configured to display the message on the test controller (181) indicating the erroneous LTE DU or the erroneous 5G DU.

The various actions, acts, blocks, steps, or the like in the flow diagram (320) may be performed in the order presented, in a different order or simultaneously. Further, in some embodiments, some of the actions, acts, blocks, steps, or the like may be omitted, added, modified, skipped, or the like without departing from the scope of the invention.

Figure 4:
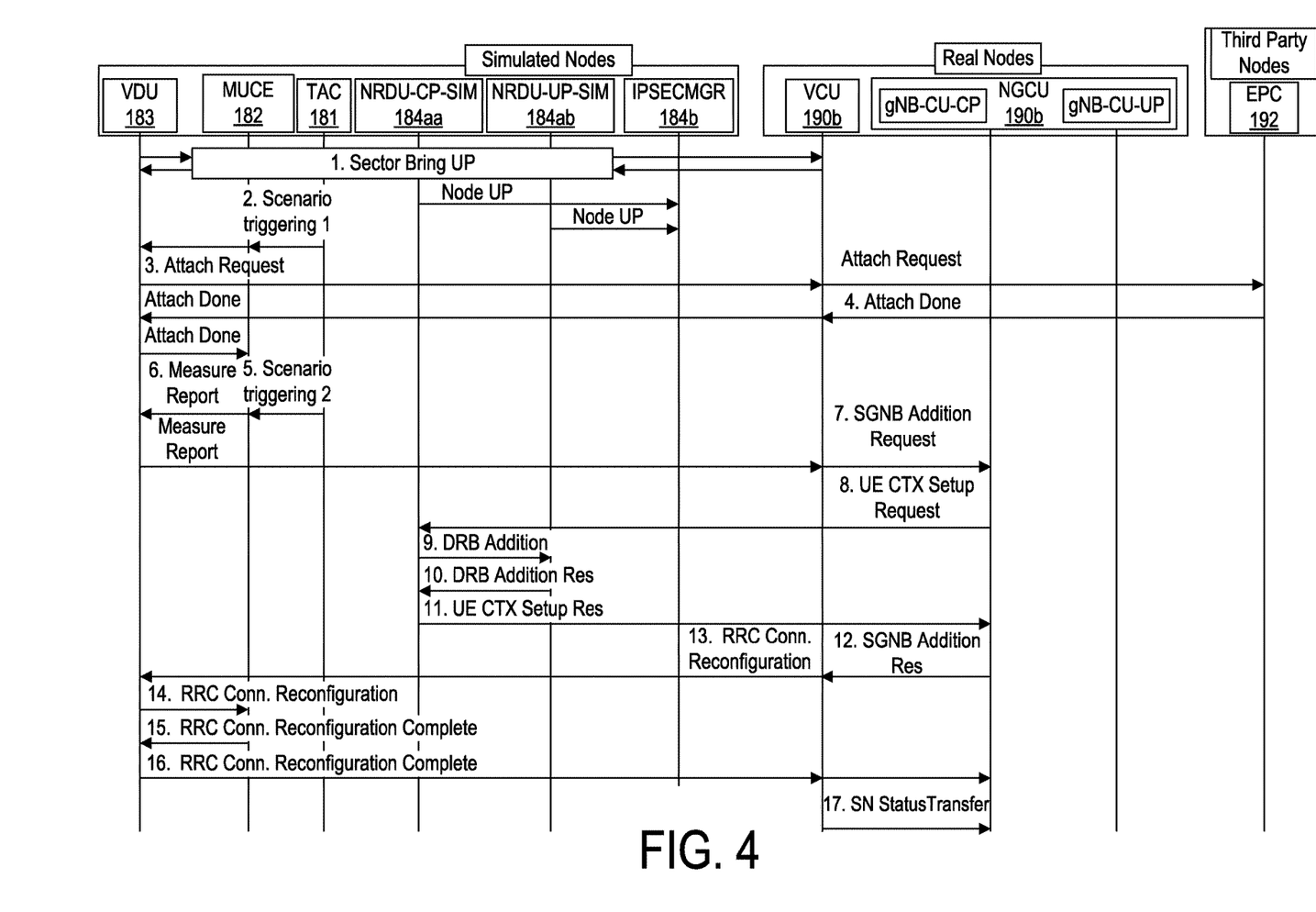
FIG. 4 is a signalling diagram illustrating various message flow between the various components of the ENDC simulation server in signalling plane, according to an embodiment as disclosed herein.

FIG. 4 is a signalling diagram illustrating various message flow between the various components of the ENDC simulation server (100) in signalling plane, according to an embodiment as disclosed herein.

Referring to the FIG. 4, consider that there are multiple LTE DUs and multiple 5G DUs. Each DU supports 12 sectors and each sector may be equivalent to a cell. Further, each DU is connected to 4 Rus and hence each RU is handling around three sectors. Each RU supports around three antennas. Each sector is allocated to one antenna. When configuration of each of the antenna, the RUs, the DU, etc are completed the specific sector is said to be brought-up. At step 1, a lot of message exchanges happen during sector bring-up. Here, one simulated DU, one sector is brought up when a radio is propagated with L1 and L2 both being up.

At step 2, consider that the test controller (181) receives the test profile from the user (indicated as scenario triggering 1). The test controller (181) will send an event to the VDU (183) to trigger the scenario as per the test profile. The scenario can include attach, detach, traffic, etc requests. At step 3, consider that the scenario is related to attach. Therefore, the attach request is sent to the VCU (190a) and further to the EPC (192). Once the attach is completed, the EPC (192) will send an attach response to the VCU (190a) which will forward the same to the VDU (183), step 4. The same is indicated to the MUCE (182).

At step 5, the test controller (181) receives the second test profile for measurement report. Similarly, the test controller (181) sends the measurement report to the VDU (183) (step 6) which in turn forward the same to the VCU (190a). At step 7, the VCU (190a) sends a SGNB addition Request to the NGCU (190b). At step 8, the NGCU (190b) sends a UE CTX Setup request to the NRDU-CP-SIM (184aa) and at step 9, the NRDU-CP-SIM (184aa) sends a DRB Addition message to the NRDU-UP-SIM (184ab). Further, at step 10, the NRDU-UP-SIM (184ab) sends a DRB Addition response to the NRDU-CP-SIM (184aa).

At step 11, the NRDU-CP-SIM (184aa) sends the UE CTX Setup response to the NGCU (190b). At step 12, the NGCU (190b) sends a SGNB Addition message to the VCU (190a).

At step 13, the VCU (190a) sends the RRC Conn. Reconfiguration message to the VDU (183) and the VDU (183) in turn sends the Reconfiguration message to the MUCE (182) (step 14). At step 15, the MUCE (182) sends the RRC Conn. Reconfiguration complete message to the VDU (183) which the VDU (183) forwards to the VCU (190a) (step 16). The VCU (190a) shares the RRC Conn. Reconfiguration complete message with the NGCU (190b). At step 17, the VCU (190a) also sends the SN Status transfer message to the NGCU (190b).

Figure 5:
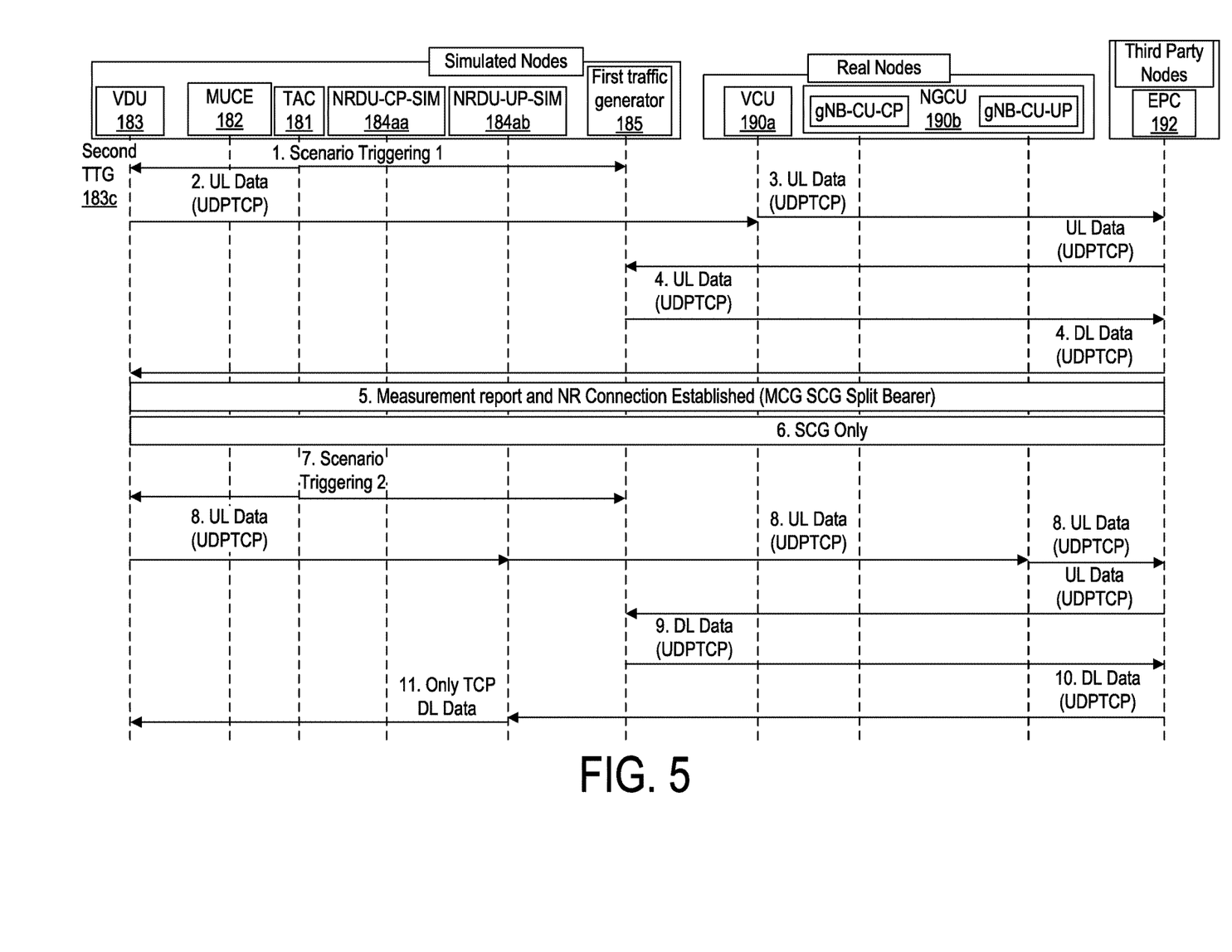
FIG. 5 is a signalling diagram illustrating various message flow between the various components of the ENDC simulation server in user plane, according to an embodiment as disclosed herein.

FIG. 5 is a signalling diagram illustrating various message flow between the various components of the ENDC simulation server (100) in user plane, according to an embodiment as disclosed herein.

Referring to the FIG. 5, at step 1, the consider that the test controller (181) receives the second test profile and initiates the same with the VDU (183) and with the first traffic generator (185). At step 2, the VDU (183) initiates UL data (UDPTCP) with the VCU (190a). At step 3, the VCU (190a) sends the UL Data (UDPTCP) to the EPC (192). The EPC (192) sends the DL Data (UDPTCP) to the first traffic generator (185). At step 5, the Measurement report and NR Connection Established (MCG SCG Split Bearer) are initiated. At step 6, SCG only mode is selected.

As a result, at step 7, when the scenario 2 is trigger, the UL data (UDPTCP) is sent from the VDU (183) to the NRDU-UP-SIM (184ab) (step 8), which then forwards it to the gNB-CU-UP. The gNB-CU-UP sends the UL data (UDPTCP) to the EPC (192). Here, only the 5G path is selected based on the measurement report.

Further, at step 9, the EPC (192) sends the DL Data request (UDPTCP) to the first traffic generator (185) and receives the DL Data request (UDPTCP) from the EPC (192) (step 10). At step 11, the EPC (192) sends only TCP DL Data to the NRDU-UP-SIM (184ab) which then sends it to the second TTG (183c) of the VDU (183).

Figure 6:
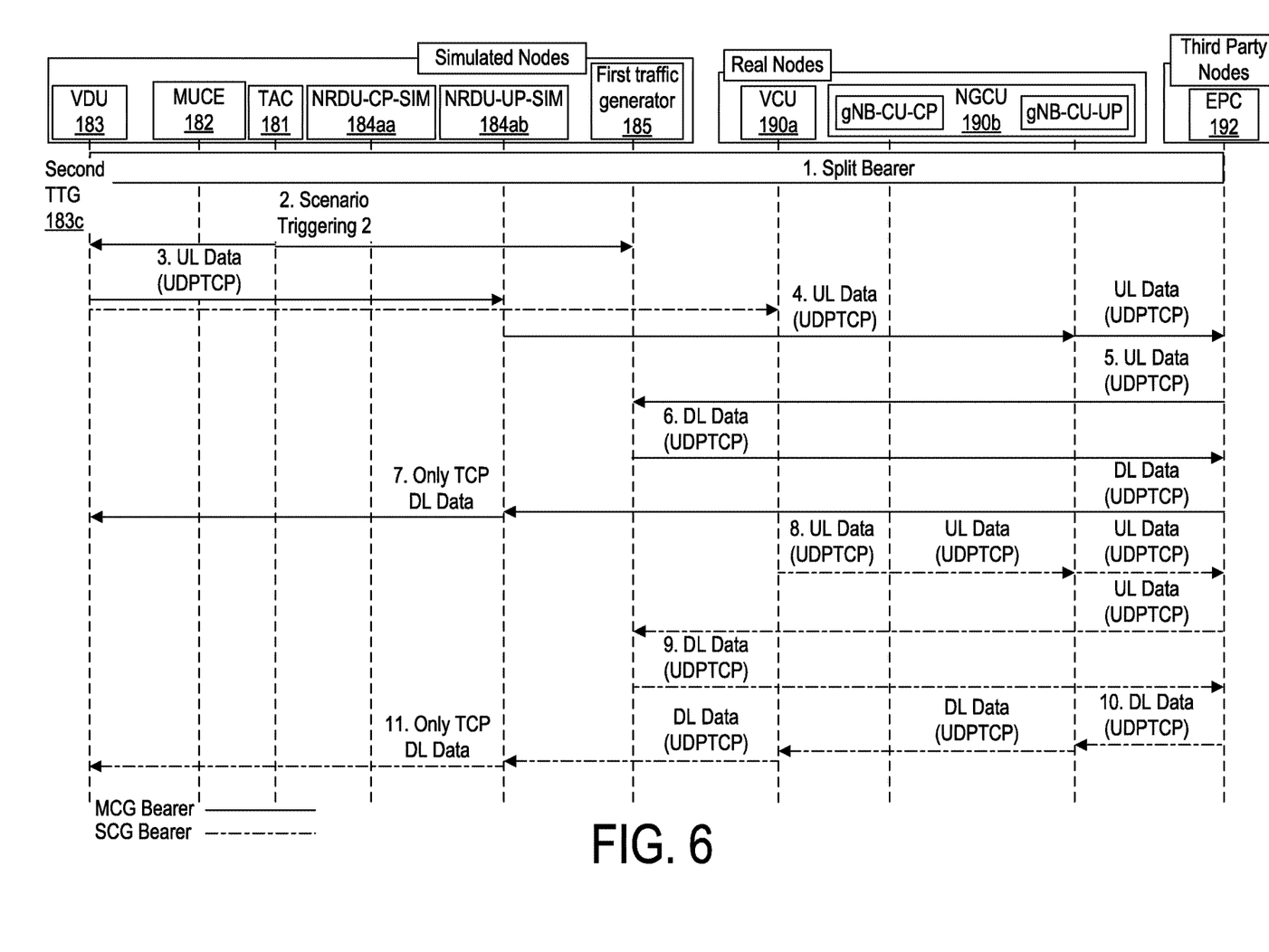
FIG. 6 is a signalling diagram illustrating various message flow between the various components of the ENDC simulation server in the user plane with split bearer, according to an embodiment as disclosed herein.

FIG. 6 is a signalling diagram illustrating various message flow between the various components of the ENDC simulation server (100) in the user plane with split bearer, according to an embodiment as disclosed herein.

Referring to the FIG. 6, at step 1, the consider that the split bearer is implemented in the ENDC simulation server (100). At step 2, the test controller (181) receives the second test profile and trigger the scenario same with the second TTG (183c) and with the first traffic generator (185). At step 3, the second TTG (183c) sends the UL Data (UDPTCP) to the NRDU-UP-SIM (184ab) and with the VCU (190a). At step 4, the NRDU-UP-SIM (184ab) sends the UL Data (UDPTCP) to the gNB-CU-UP of the NGCU (190b) and forwarded to the EPC (192).

At step 5, the EPC (192) sends the UL Data (UDPTCP) to the first traffic generator (185). At step 6, the first traffic generator (185) sends the DL Data (UDPTCP) to the EPC (192). Further, the EPC (192) sends the DL Data (UDPTCP) to the NRDU-UP-SIM (184ab). At step 7, the NRDU-UP-SIM (184ab) sends only TCP DL data to the first traffic generator (185). At step 8, the VCU (190a) sends the UL Data (UDPTCP) to the gNB-CU-UP and then the gNB-CU-UP forwards it to the EPC (192). Further, at step 9, the EPC (192) sends the DL Data (UDPTCP) to the first traffic generator (185) and at step 10, the first traffic generator (185) initiates the DL Data (UDPTCP) to the EPC (192). Further, the EPC (192) sends the DL Data (UDPTCP) towards the NRDU-UP-SIM (184ab) and at step 12, the NRDU-UP-SIM (184ab) sends only TCP DL Data towards the second TTG (183c). Therefore, the traffic begins and ends at the traffic generators which makes the proposed system a closed environment.

Therefore, the proposed method includes the following advantages:

1. A unified environment is generated for deploying the LTE, ENDC and NR nodes in a simulated framework
2. Smaller resource footprint when compared to existing simulators with lesser capacity VMs.
3. Flexibility of choosing VM resources based on scenario (i.e., lesser number of CPU cores and Memory per VM in case of smaller deployment scenario)
4. Reduces cost of deployment of tools for capacity and performance testing.
5. Ability to handle multi Gbps of data traffic in the simulation mode The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. An E-UTRAN New Radio-Dual Connectivity (ENDC) simulation server for testing a node in a wireless communication network, wherein the ENDC simulation server comprises:
a memory;
a processor coupled to the memory;
a communicator coupled to the memory and the processor;
wherein the processor comprises:
a simulated virtual distributed unit (VDU) connected to a virtual long-term evolution (LTE) centralized unit (VCU) to be tested;
a simulated new radio distributed unit (NRDU) connected to a next generation centralized unit (NGCU) to be tested;

a test controller connected to a plurality of simulated UEs configured to receive at least one testing profile associated with the ENDC simulation server;

a multi user equipment (UE) simulator (MUCE) configured to dynamically generate a plurality of simulated UEs based on the at least one testing profile:

a first traffic generator configured to generate a traffic profile based on the at least one testing profile;

wherein the simulated VDU comprises:
an LTE DU simulator configured to generate a plurality of simulated LTE DUs based on the at least one testing profile,
a second traffic generator configured to generate a traffic profile based on the at least one testing profile, and wherein the simulated NRDU comprises:
a 5G DU simulator configured to generate a plurality of simulated 5G DUs based on the at least one testing profile,
an IP security Manager (IPSEC MGR) configured to simulate internet protocol (IPSEC) functionality between at least one 5G DU and the NGCU.

2. The ENDC simulation server as claimed in claim 1, wherein the first traffic generator is a downlink (DL) traffic generator which is a source of DL traffic and an end point of UL traffic and wherein the second traffic generator is an uplink (UL) traffic generator which is a source of UL traffic and an end point of DL traffic.

3. The ENDC simulation server as claimed in claim 1, wherein the 5G DU simulator comprises a Control Plane Simulator (CPSIM) configured to simulate control plane functionality between at least one 5G DU and the NGCU based on the at least one testing profile and a User Plane Simulator (UPSIM) configured to simulate user plane functionality between at least one 5G DU and the NGCU based on the at least one testing profile.

4. The ENDC simulation server as claimed in claim 1, wherein the processor is configured to:
test the VCU and the NGCU based on the received at least one testing profile, wherein the test is at least one of function testing, a capacity testing and a coverage testing for the VCU and the NGCU using the plurality of UEs.

5. The ENDC simulation server as claimed in claim 1, wherein VDU SIM of the VDU comprises the second traffic generator and Packet Data Convergence Protocol (PDPC) manager and wherein the IPSEC MGR simulates the IPSEC functionality by encrypting at least one of a UP payload and a CP payload.

6. The ENDC simulation server as claimed in claim 1, wherein the at least one testing profile comprises at least one of: a number of UEs to be simulated, a traffic profile for each simulated UE, a number of DUs to be simulated, number of cells, number of sectors within each of the cells, routes for connecting each of the cells and channel conditions to be simulated and wherein the traffic profile for each simulated UE comprises at least one of a speed at which the simulated UE travels through the network and a traffic pattern mixture of data and voice calls.

7. The ENDC simulation server as claimed in claim 1, wherein the traffic generated by the second traffic generator is communicated to the VCU through an Internal Router Application (IROUTER) of the simulated VDU.

8. The ENDC simulation server as claimed in claim 1, wherein the ENDC simulation server provides communication between the simulated VDU, the simulated NGDU, the VCU and the NGCU using one of a Secondary Cell Group (SCG) path of communication and a split bearer by splitting the traffic into two paths.

9. The ENDC simulation server as claimed in claim 1, wherein the processor is further configured to:
determine at least one of a UE load meets a UE load threshold and a 5G DU load meets a 5G DU load threshold or a LTE DU load meets a LTE DU load threshold, wherein the UE load is determined based on a number of UEs to be simulated, the 5G DU load is based on a number of 5G DUs to be simulated AND the LTE DU load is based on a number of LTE DUs to be simulated; and
deploy at least one of the plurality of simulated UEs, the plurality of simulated 5G DUs or the plurality of simulated LTE DUs in another ENDC simulation server.

10. The ENDC simulation server as claimed in claim 1, wherein the processor is further configured to:
determine an error in at least one of: 5G DU during the testing of the NGCU and at least one LTE DU during the testing of the VCU;
continue the test of the at least one of: the NGCU using the remaining 5G DUs of the plurality of 5G DUs after excluding erroneous 5G DU and, the VCU using the remaining LTE DUs of the plurality of LTE DUs after excluding erroneous LTE DU; and
display a message on the test controller indicating the erroneous LTE DU or the erroneous 5G DU.

11. A method for testing a node in a wireless communication network using an E-UTRAN New Radio-Dual Connectivity (ENDC) simulation server, wherein the method comprises:
receiving, by the ENDC simulation server, at least one testing profile associated with at least one of VCU and NGCU, wherein the ENDC simulation server comprises a simulated VDU and a simulated NRDU;
generating, by the ENDC simulation server, a plurality of simulated UEs and at least one of plurality of simulated LTE DUs and a plurality of simulated 5G DUs based on the at least one testing profile;
generating, by the ENDC simulation server, a signalling path through the simulated VDU and a data path through the simulated NRDU;
generating, by the ENDC simulation server, a traffic profile for the plurality of simulated UEs based on the at least one testing profile; and
testing, by the ENDC simulation server, at least one of the VCU and the NGCU based on the generated traffic profile, wherein the test is at least one of function testing, a capacity testing and a coverage testing for the at least one of the VCU and the NGCU using the plurality of UEs.

12. The method as claimed in claim 11, wherein the first traffic generator is a downlink (DL) traffic generator which is a source of DL traffic and an end point of UL traffic and wherein the second traffic generator is an uplink (UL) traffic generator which is a source of UL traffic and an end point of DL traffic.

13. The method as claimed in claim 11, wherein the 5G DU simulator comprises a Control Plane Simulator (CPSIM) configured to simulate control plane functionality between at least one 5G DU and the NGCU based on the at least one testing profile and a User Plane Simulator (UPSIM) configured to simulate user plane functionality between at least one 5G DU and the NGCU based on the at least one testing profile.

14. The method as claimed in claim 11, further comprises:
testing, by the ENDC simulation server, the VCU and the NGCU based on the received at least one testing profile, wherein the test is at least one of function testing, a capacity testing and a coverage testing for the VCU and the NGCU using the plurality of UEs.

15. The method as claimed in claim 11, wherein VDU SIM of the VDU comprises the second traffic generator and Packet Data Convergence Protocol (PDPC) manager and wherein the IPSEC MGR simulates the IPSEC functionality by encrypting at least one of a UP payload and a CP payload.

16. The method as claimed in claim 11, wherein the at least one testing profile comprises at least one of: a number of UEs to be simulated, a traffic profile for each simulated UE, a number of DUs to be simulated, number of cells, number of sectors within each of the cells, routes for connecting each of the cells and channel conditions to be simulated and wherein the traffic profile for each simulated UE comprises at least one of a speed at which the simulated UE travels through the network and a traffic pattern mixture of data and voice calls.

17. The method as claimed in claim 11, wherein the traffic generated by the second traffic generator is communicated to the VCU through an Internal Router Application (IR-OUTER) of the simulated VDU.

18. The method as claimed in claim 11, wherein the ENDC simulation server provides communication between the simulated VDU, the simulated NGDU, the VCU and the NGCU using one of a Secondary Cell Group (SCG) path of communication and a split bearer by splitting the traffic into two paths.

19. The method as claimed in claim 11, further comprises:
determining, by the ENDC simulation server, at least one of a UE load meets a UE load threshold and a 5G DU load meets a 5G DU load threshold or a LTE DU load meets a LTE DU load threshold, wherein the UE load is determined based on a number of UEs to be simulated, the 5G DU load is based on a number of 5G DUs to be simulated AND the LTE DU load is based on a number of LTE DUs to be simulated; and
deploying, by the ENDC simulation server, at least one of the plurality of simulated UEs, the plurality of simulated 5G DUs or the plurality of simulated LTE DUs in another ENDC simulation server.

20. The method as claimed in claim 11, further comprises:
determining, by the ENDC simulation server, an error in at least one of: 5G DU during the testing of the NGCU and at least one LTE DU during the testing of the VCU;
continuing, by the ENDC simulation server, the test of the at least one of: the NGCU using the remaining 5G DUs of the plurality of 5G DUs after excluding erroneous 5G DU and, the VCU using the remaining LTE DUs of the plurality of LTE DUs after excluding erroneous LTE DU; and
displaying, by the ENDC simulation server, a message on the test controller indicating the erroneous LTE DU or the erroneous 5G DU.

* * * * *